(12) United States Patent
Chen et al.

(10) Patent No.: US 7,664,053 B2
(45) Date of Patent: Feb. 16, 2010

(54) METHOD AND SYSTEM FOR IMPLEMENTING MULTICAST USING SLAVE BLOCK IN DIGITAL SUBSCRIBER LINE ACCESS TECHNIQUE

(75) Inventors: Wumao Chen, Shenzhen (CN); Yong Luo, Shenzhen (CN); Dingbo Cao, Shenzhen (CN); Bo Ke, Shenzhen (CN); Meng Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 194 days.

(21) Appl. No.: 11/771,044

(22) Filed: Jun. 29, 2007

(65) Prior Publication Data

US 2008/0123647 A1 May 29, 2008

Related U.S. Application Data

(63) Continuation of application No. PCT/CN2005/002327, filed on Dec. 27, 2005.

(30) Foreign Application Priority Data

Dec. 30, 2004 (CN) .................. 2004 1 0077712

(51) Int. Cl.
*H04L 12/28* (2006.01)
*H04L 12/56* (2006.01)
*H04L 12/54* (2006.01)
*H04J 3/26* (2006.01)
*G06F 15/16* (2006.01)
*G06F 15/177* (2006.01)

(52) U.S. Cl. .................. 370/254; 370/390; 370/395.52; 370/428; 370/432; 709/208; 709/220

(58) Field of Classification Search .................. 370/420, 370/254, 390, 395.52, 428, 432; 709/208, 709/220
See application file for complete search history.

(56) References Cited

U.S. PATENT DOCUMENTS 6,834,038 B1   12/2004   Zelig et al.

(Continued)

FOREIGN PATENT DOCUMENTS

CN        1366409 A        8/2002

(Continued)

OTHER PUBLICATIONS

3COM, "Data Sheet: 3Com Office Connect Remote 812 ADSL Router," (2001) http://www.3com.com/other/pdfs/product.

(Continued)

*Primary Examiner*—Alpus H Hsu
*Assistant Examiner*—Saad Hassan
(74) *Attorney, Agent, or Firm*—Leydig, Voit & Mayer, Ltd.

(57) ABSTRACT

Embodiments of the present invention provide a method and a system for implementing multicast using a slave block in DSL access technique. Several slave blocks are cascaded with a master block accessed to the DSL. The master block and slave block are respectively connected with DSL users via RTUs, and access an uplink via a network interface of the master block. The slave block is configured to support the IGMP proxy or the IGMP snooping so as to implement multicast function independently. This invention overcomes the shortcomings including the heavy burden on the master block, low efficiency and serious waste in bandwidth resulting from the fact that the operation of the slave block multicast member is implemented in the master block, thus increasing the efficiency of multicast and saving bandwidth of the master block.

20 Claims, 3 Drawing Sheets

U.S. PATENT DOCUMENTS

| | | | |
|---|---|---|---|
| 2002/0097728 A1 | 7/2002 | Hinderks et al. | |
| 2004/0141609 A1 | 7/2004 | Shi | |
| 2004/0205215 A1* | 10/2004 | Kouvelas et al. | 709/231 |
| 2004/0264443 A1 | 12/2004 | Beck et al. | |
| 2006/0045085 A1* | 3/2006 | He | 370/390 |

FOREIGN PATENT DOCUMENTS

| | | |
|---|---|---|
| CN | 1403929 | 3/2003 |
| EP | 1 359 709 A2 | 11/2003 |
| EP | 1 492 381 A1 | 12/2004 |
| WO | WO02/43301 A2 | 5/2002 |

OTHER PUBLICATIONS

Brayley, "The Future of IPTV: Business and Technology Challenges," (Jul. 2005) http://www.iptvarticles.com/IPTVMagazine‾2005‾07‾Future‾of‾IPTV.htm.

Cain et al., "RFC 3376: Internet Group Management Protocol Version 3," IETF (Oct. 2002).

Fenner et al., "IGMP/MLD-based Multicast Forwarding (IGMP/MLD Proxying)," IETF (Apr. 2004) http://draft-ietf-magma-igmp-proxy-06.txt.

OCCAM Networks, Inc., "Broadband Loop Carrier: Enabling Video in a Triple Play Architecture," (Jan. 2003) http://www.occamnetworks.com/pdf/TriplePlay‾whitepaper.pdf.

Shoaf et al., "Introduction to IGMP for IPTV Networks," (Jun. 2006) https://www.apac-juniper.net/juniper‾public/campaign/pdf/iptv/kr/200188.pdf?CFID=181324&CFTOKEN=91802505.

Shoaf et al., "IGMP Capabilities in Broadband Network Architectures," http://www.juniper.net/solutions/literature/app note?350060.pdf.

* cited by examiner

METHOD AND SYSTEM FOR
IMPLEMENTING MULTICAST USING SLAVE
BLOCK IN DIGITAL SUBSCRIBER LINE
ACCESS TECHNIQUE

This application is a continuation of International Patent Application No. PCT/CN2005/002327, filed Dec. 27, 2005, which claims priority to Chinese Patent Application No. 200410077712.X, filed Dec. 30, 2004, all of which are hereby incorporated by reference.

FIELD OF THE INVENTION

The present invention relates to communications technologies, and particularly to a method and a system for implementing multicast using a slave block in Digital Subscriber Line (xDSL) access technique.

BACKGROUND OF THE INVENTION

Digital Subscriber Line (DSL) is a transmission technology combination in which copper telephone lines act as transmission media. The DSL includes High Rate Digital Subscriber Line (HDSL), Symmetric Digital Subscriber Line (SDSL), Very High Rate Digital Subscriber Line (VDSL), Asymmetric Digital Subscriber Line (ADSL), Rate Adaptive Digital Subscriber Line (RADSL), etc., usually called as xDSL. There is a higher and higher XDSL access density, which is described by taking ADSL as an example. ADSL access is still used in high speed Internet access and in dedicated line services. Along with the growth of network video, distance learning, stock information transferring in real time and other multipoint communication services, providing multicast services by means of ADSL broadband access becomes an inevitable trend. In addition, along with a popular ADSL access application, more and more users need to access one access site, and a higher access density for an ADSL access apparatus is needed. Therefore high density will become a trend for the ADSL access apparatus.

In multicast services, the problems such as capture, identification, forwarding, management of multicast user, and right management of multicast user need to be solved principally. High access density in an ADSL apparatus is mainly implemented by cascading a slave block and a master block, and both the master block and the slave block implement the access function of an ADSL user. One master block may be cascaded with a plurality of slave blocks, and the ADSL user of the slave block accesses a network via the master block. The cascading of the slave block is a method for expanding ADSL access capacity. The master block is cascaded with the slave block via a cascaded interface board so as to implement the ADSL access of the slave block and to manage the slave block. Slave block multicast is needed because there is a need to support multicast services for ADSL users of the slave block. For the slave block multicast, how to conveniently manage multicast configuration data and efficiently implement multicast functions in real time are problems to be emphatically solved.

Figure 1:
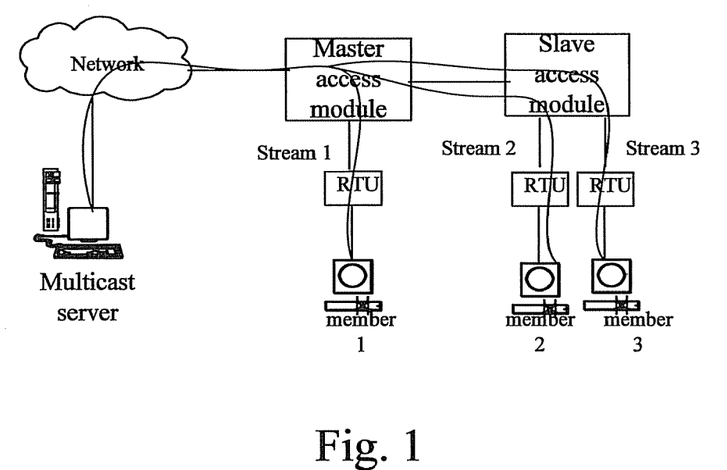
FIG. 1 is a schematic diagram illustrating a structure with a master block and a slave block cascaded in the prior art.

As shown in FIG. 1, in the prior art, the master block (i.e., master access module) and the slave block (i.e., slave access module) are connected with each other via an internal interface (the internal interface is an integrated channel for transferring unicast data, multicast data, and control information), access ADSL users respectively via a Remote Terminal Unit (RTU), and access a network via a network interface of the master block. The multicast message of ADSL user, accessed via the slave block, reaches the master block via Virtual Connection (VC) and is captured by the master block. The master block will identify the multicast message, authenticate the rights of multicast members, and forward multicast data to the VC of the multicast members. In addition, the configuration data of multicast is directly saved in the master block, and is not saved in the slave block. In this solution, the master block saves the configuration data of multicast and performs the multicast functions. The slave block only accesses the ADSL user and does not participate in the performing of multicast function. All the operation related to multicast (e.g., capture, explanation, authentication, and copying of multicast messages) is done by the master block. The slave block only provides a VC channel to enable the interaction between the ADSL users and the multicast module of the master block. The multicast control message (e.g., report message or leave message) is transferred from the ADSL user to the multicast server via the master block or the slave block and the multicast data message is transferred from the multicast server to the ADSL user via the master block or the slave block.

Figure 2:
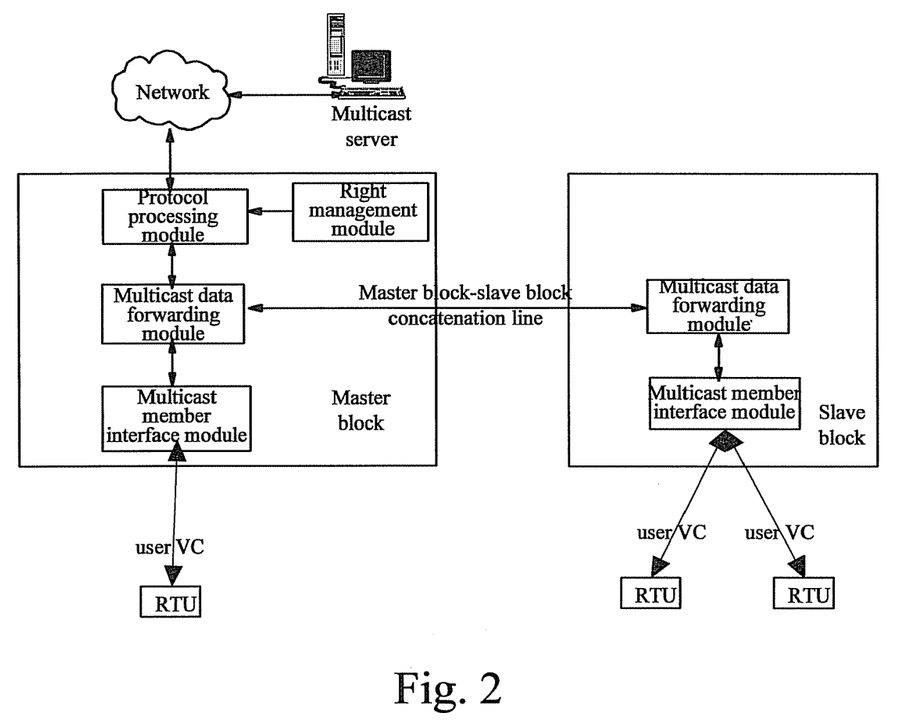
FIG. 2 is a schematic diagram illustrating an operational principle in the prior art.

As shown in FIG. 2, the master block includes a protocol processing module, a multicast data forwarding module, a right management module, and a multicast member interface module. The protocol processing module is responsible for processing the IGMP multicast protocol and maintaining a multicast forwarding table; the multicast data forwarding module forwards multicast data to multicast members according to the multicast forwarding table. The right management module manages the rights of the multicast members and authenticates the multicast members. The multicast interface module manages multicast member interfaces. The slave block includes a multicast data forwarding module and a multicast member interface module. The multicast data forwarding modules of the master block and the slave block are connected with each other via cascaded lines.

The inventor of the present invention discloses following issues of the prior art in the design of the present invention.

1) The operation of the multicast member of a slave block is conducted in the master block, which results in a heavy burden on the master block and a low efficiency.

2) There is a serious waste in bandwidth. Duplicating the multicast data of the slave block by the master block has a high requirement on bandwidth resources of the master block. Multicast is a point to multipoint switching technique with a problem of a duplication point. In the prior art, the duplication point is in the master block. For example, if 100 ADSL users require joining one same group in the slave block, the master block will make 100 copies and send them to the slave block, and thus the bandwidth of 100 copies of multicast streams is consumed for the internal interfaces of the master block and the slave block, and for the internal bus of the master block.

SUMMARY OF THE INVENTION

Embodiments of the present invention provide a method and a system for implementing multicast using a slave block in DSL access technique to overcome the shortcomings including the heavy burden on a master block, low efficiency and serious waste in bandwidth resulting from the fact that the operation of the multicast member of the slave block is implemented in the master block in the prior art, thus increasing the efficiency of multicast and saving the bandwidth of the master block.

The solution provided by the present invention is described as below.

A method for implementing multicast using a slave block in Digital Subscriber Line (DSL) access technique includes:
cascading a master bloc and at least one slave block,
connecting the master block and the at least one slave block with DSL users via Remote Terminal Units (RTUs) respectively, and accessing a network via a network interface of the master block; and
configuring the slave block to make the slave block support the Internet Group Management Protocol (IGMP) proxy or the IGMP snooping to enable the slave block implement a multicast function independently.

The multicast function includes capture, identification, forwarding of multicast messages, maintenance of multicast forwarding table, and maintenance of multicast member state.

The master block and the slave block communicates with each other via at least one channel to transfer unicast data, multicast data, and control information.

The at least one channel includes:

a unidirectional multicast channel for transferring multicast data from the master block to the slave block, and a bi-directional unicast channel for transferring unicast data, multicast control messages, and control management information between the master block and the slave block.

The method of Claim further includes:

saving configuration data of the master block and the slave block in the master block; and synchronizing the configuration data from the master block to the slave block via an internal protocol.

The synchronizing the configuration data includes:

when the slave block is started, sending, by the master block, the configuration data of the slave block to the slave block via a unicast channel using the internal protocol; and making, by the slave block, a configuration according to the obtained configuration data for a slave block multicast to go in a working state.

The synchronizing the configuration data includes:

when the configuration data of the slave block is modified, sending, by the master block, a message to instruct the slave block to make a synchronous modification; and saving the configuration data in the master block for implementing centralized management.

The method further includes:

when joining a multicast group, sending, by the slave block, a report message to the master block via a unicast channel, and forwarding, by the master block, multicast data to the slave block; and when leaving a multicast group, sending, by the slave block, a leave message to the master block via the unicast channel, and stopping, by the master block, forwarding the multicast data to the slave block.

The method further includes:

saving, by the master block and the slave block, configuration data of the master block and the slave block independently and respectively;

when the slave block is started, obtaining directly, by the slave block, the configuration data for configuration, and for the slave block to go in a working state;

when the configuration data of the slave block is modified, modifying and saving directly, by the slave block, the configuration data.

The method further includes:

when joining a multicast group, sending, by the slave block, a report message to the master block via a unicast channel, and forwarding, by the master block, the multicast data to the slave block; and when leaving a multicast group, sending, by the slave block, a leave message to the master block via the unicast channel, and stopping, by the master block, forwarding the multicast data to the slave block.

A system for implementing multicast using a slave block in Digital Subscriber Line (DSL) access technique includes a multicast server and a master block connected with each other via a network, and a slave block connected with the master block;

the master block and the slave block are respectively connected with RTUs, access DSL users via Remote Terminal Units (RTUs), and access a network via a network interface of the master block; and the slave block supports an Internet Group Management Protocol (IGMP) proxy or an IGMP snooping to implement a multicast operation independently.

The master block and the slave block each includes a protocol processing module, a multicast data forwarding module, a right management module, a multicast member interface module, and a master-slave communication module; and the connection between the master-slave communication modules of the master block and the slave block forms a unicast channel, the connection between multicast data forwarding modules of the master block and the slave block forms a multicast channel.

A slave block used in Digital Subscriber Line (DSL) access technique includes:

a protocol processing module, for processing an Internet Group Management Protocol (IGMP) multicast protocol and maintaining a multicast forwarding table;

a multicast data forwarding module, for forwarding multicast data to a multicast member of the slave block according to the multicast forwarding table;

a multicast member interface module, for managing an interface between the slave block and the multicast member; and a master-slave communication module, for communicating multicast information between the master block and the slave block;

the multicast data forwarding module is connected with the protocol processing module and the multicast member interface module respectively, and connected with a multicast data forwarding module of a master block; and the master-slave communication module is connected with the protocol processing module.

The master-slave communication module is connected with a master-slave communication module of the master block to form a unicast channel; and the multicast data forwarding module of the slave block is connected with the multicast data forwarding module of the master block to form a multicast channel.

The slave block further includes:

a right management module, for managing the right of the multicast member and authenticating the multicast member.

The beneficial effects of this invention are as follows. In accordance with the embodiments of the present invention, a multicast function is performed in a distributed way. Since a master block and a slave block independently supports the multicast function, the master block needs to forward only one copy of multicast data to the slave block. The slave block independently forwards the multicast data to multicast members of the slave block, and the master block does not need to do so, thereby considerably saving the bandwidth of the master block, and increasing the efficiency of the master block.

Either the distributed management or the centralized management of multicast configuration data may be adopted in accordance with the embodiments of the present invention. In the case of centralized management, the configuration data of the master block and the slave block are uniformly saved in the master block with the data synchronization made via the internal data protocol, thereby facilitating management and increasing efficiency of the implementation. In accordance with the embodiments of the present invention, multicast data are forwarded from the master block to the slave block on demand, and only one copy of multicast data needed by the slave block needs to be sent to the slave block, and thus the bandwidth of the system is used dynamically, thereby avoiding unnecessary waste in bandwidth, reducing the administrative cost for operators, and being convenient for maintenance. Meanwhile, unicast and multicast channels may be adopted between the master block and the slave block, multicast data and control message are transferred via different interfaces respectively, thereby ensuring the QoS of different services.

EMBODIMENTS OF THE INVENTION

The present invention is hereinafter further described in detail according to the accompanying drawings and embodiments.

Figure 3:
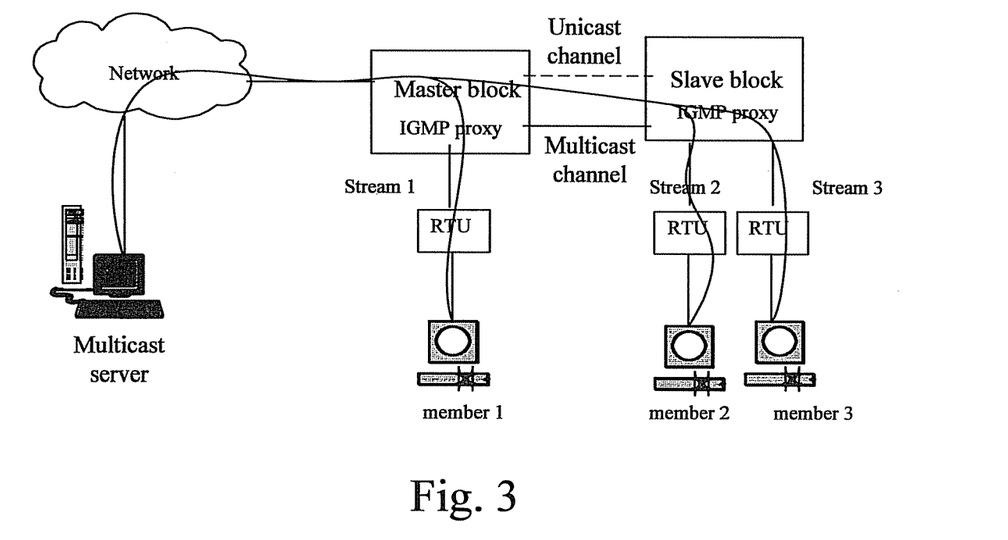
FIG. 3 is a schematic diagram illustrating a structure with a master block and a slave block cascaded in accordance with an embodiment of the present invention.

As shown in FIG. 3, in accordance with an embodiment of the present invention, apart from that a master block supports IGMP proxy or IGMP Snooping functions, the same configuration in the slave block is made as in the master block, so that the slave block also supports IGMP proxy or IGMP Snooping functions, i.e., both master block and slave block can independently perform multicast functions. The slave block does not have an interface connected with the network, so it cannot access multicast data on the network side. The multicast data are transferred to the slave block via an interface between the master block and the slave block. Thus, in accordance with embodiments of the present invention, the multicast functions are performed in a distributed way. The multicast functions include capture, identification, and forwarding of multicast messages, and maintenance of the multicast forwarding table and multicast member state. These functions are independently performed between the master block and the slave block respectively and in a parallel way, thereby increasing the efficiency of multicast. Furthermore, since the master block and the slave block independently support the multicast functions, the master block only needs to forward one copy of multicast data to the slave block; and the slave block then independently forwards the multicast data to the multicast members of the slave block, while the master block does not need to do so, thereby considerably saving the bandwidth of the master block, and increasing the efficiency of the master block.

The master block and the slave block communicate with each other using an internal protocol. One integrated channel transferring unicast data, multicast data, and control information may be adopted for communication between the master block and the slave block, or the master block and the slave block are connected by two different interfaces so as to transfer multicast data and control messages via the different interfaces, thereby ensuring the QoS of different services. The case of adopting two channels is taken as an example as shown in FIG. 3. Two channels are provided between the master block and slave block, one is a unidirectional multicast channel for bearing multicast data from the master block to the slave block (as a real line shown in FIG. 3), another one is a bi-directional unicast channel for bearing unicast data, a multicast control message, and control management information between the master block and the slave block (as a broken line shown in FIG. 3). The unicast data refers to the unicast service data when an ADSL user browses webpage and uploads data; the multicast control message refers to IGMP multicast control message, including report message, leave message, and query message; and the control management information between the master block and the slave block refers to the internal protocol used when the master block data and the slave block data are synchronized.

If the master block and the slave block are regarded as a node in network management, the configuration data of the master block and the slave block may be both saved in the master block, and the configuration data of the slave block are not saved in the slave block. Multicast data of the slave block can, when queried, be read directly from the master block, and it is not necessary to query the slave block via the internal protocol. In this way, the centralized management of the multicast data can be realized. Concretely, the configuration data of the master block and the slave block are uniformly saved in the master block, the synchronization of data is made via an internal protocol. The multicast data are regarded as a separate data configuration in operation and management, thereby reducing the administrative cost for operators, and providing convenient maintenance. If the master block and the slave block are regarded as an independent node in network management, the configuration data of the slave block may also be saved in the slave block.

Figure 4:
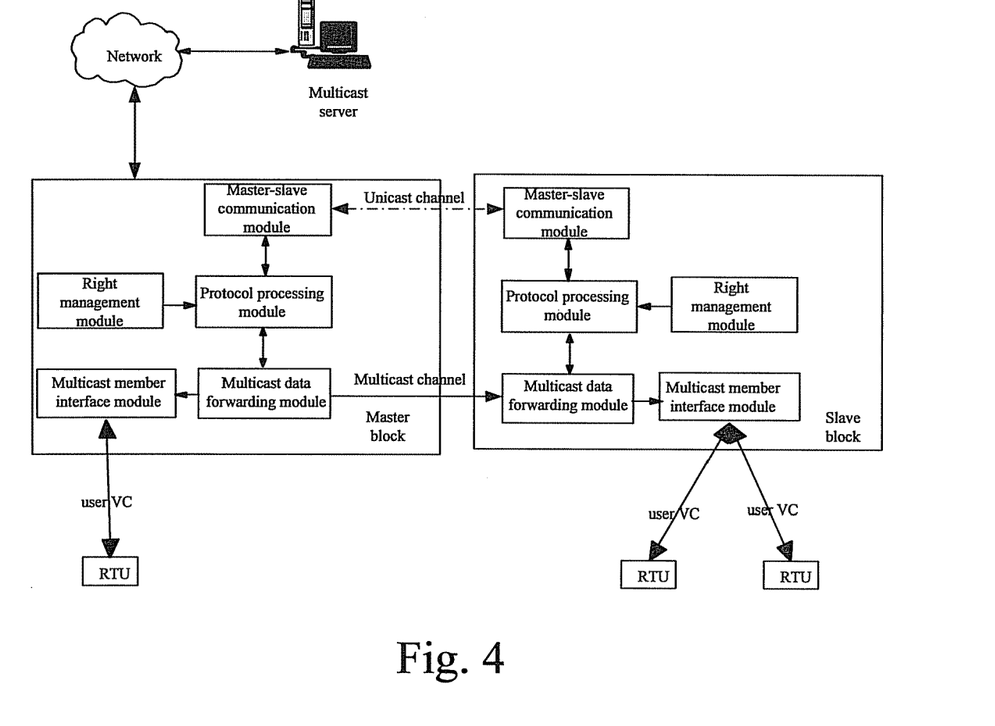
FIG. 4 is a schematic diagram illustrating a system in accordance with another embodiment of the present invention.

A detailed description is hereinafter given by taking the centralized management and distributed execution of the master block and the slave block, and that two channels are adopted for the master block and the slave block as an example, with reference to a system in accordance with an embodiment of the present invention as shown in FIG. 4. The system for implementing multicast using a slave block in DSL access technique includes a multicast server and a master block connected with each other via a network, and a slave block connected with the master block. The master block and the slave block are respectively connected with DSL users via RTUs, and access a network via a network interface of the master block. The slave block is a slave block supporting the Internet Group Management Protocol (IGMP) proxy or the IGMP snooping and independently implementing multicast operations. The master block includes a protocol processing module, a multicast data forwarding module, a right management module, a multicast member interface module, and a master-slave communication module. The slave block also includes a protocol processing module, a multicast data forwarding module, a right management module, a multicast member interface module, and a master-slave communication module. The connection between master-slave communication modules of the master block and slave block forms a unicast channel. The connection between multicast data forwarding modules of the master block and the slave block forms a multicast channel. The protocol processing module of the slave block is responsible for processing the IGMP multicast protocol and maintaining the multicast forwarding table. The multicast data forwarding module of the slave block forwards multicast data to multicast members according to the multicast forwarding table. The right management module of the slave block manages and authenticates the rights of multicast members of the slave block. The multicast member interface module of the slave block manages the interface between the slave block and the multicast members of the slave block. The master-slave communication module of the slave block is responsible for multicast information interaction between the master block and the slave block.

The working process of the master block and the slave block are hereinafter described in detail.

The multicast data of the slave block is saved in the master block in a centralized way, and different data are saved in different modules. Multicast group data and multicast protocol parameters are saved in the master block protocol processing module. Multicast member data are saved in the right management module of the master block. Therefore, the data in the slave block need to be synchronized by the data in the master block when the slave block is started or the multicast data of the slave block are modified. When the slave block is started, the master block issues the multicast configuration data of the slave block to the slave block via a unicast channel using an internal protocol. The contents to be issued include: multicast group data, multicast member attribute data, multicast protocol data, etc. The slave block configures a chipset and recovers a software table according to the configuration data, and a slave block multicast goes into a working state. The process of recovering and configuring is described as follows.

1) Recovering Multicast Group Data

The software and hardware table need to be recovered, including IP addresses, description and other attributes corresponding to the multicast group. During configuration, the master block finds out the data corresponding to the slave block, encapsulates the data according to the protocol defined internally, and sends the data encapsulated to the slave block via the unicast channel in a message mode.

2) Recovering the Data of Multicast Member Attribute

The principal contents include ADSL interfaces corresponding to multicast members, rights of the multicast members, and other attributes of the multicast members. Recovering the data of multicast member attribute is a recovery of software table, and the data issued by the master block need to be written in the software table corresponding to the slave block.

3) Recovering Multicast Protocol Data

IGMP multicast function switch, general group query interval, general group query response time, robustness coefficient and the like are included. The recovery of the IGMP multicast function switch is a recovery of hardware table; if it is turned on, the function of capturing the IGMP message by hardware in the slave block is turned on; otherwise, the function is turned off. Recovery of other attributes is a recovery of software table, and the other attributes need to be written in the corresponding software table.

When the configuration data of the slave block is modified, the master block sends a message to instruct the slave block to make a synchronous modification, and saves the data in the master block, thereby implementing the centralized management.

When the master block forwards multicast data to the slave block, the master block takes the slave block as a multicast member. The control message between the master block and the slave block is communicated via a unicast channel in an internal message mode. The control messages between the master block and the slave block include a report message, a leave message, and a query message. When joining a multicast group, the slave block sends a report message to the master block via the unicast channel, and the master block forwards multicast data to the slave block. When leaving a multicast group, the slave block sends a leave message to the master block via the unicast channel, and the master block stops forwarding multicast data to the slave block. In order to maintain the multicast forwarding table, the master block needs to send a query message to the slave block.

Figures 5, 6:
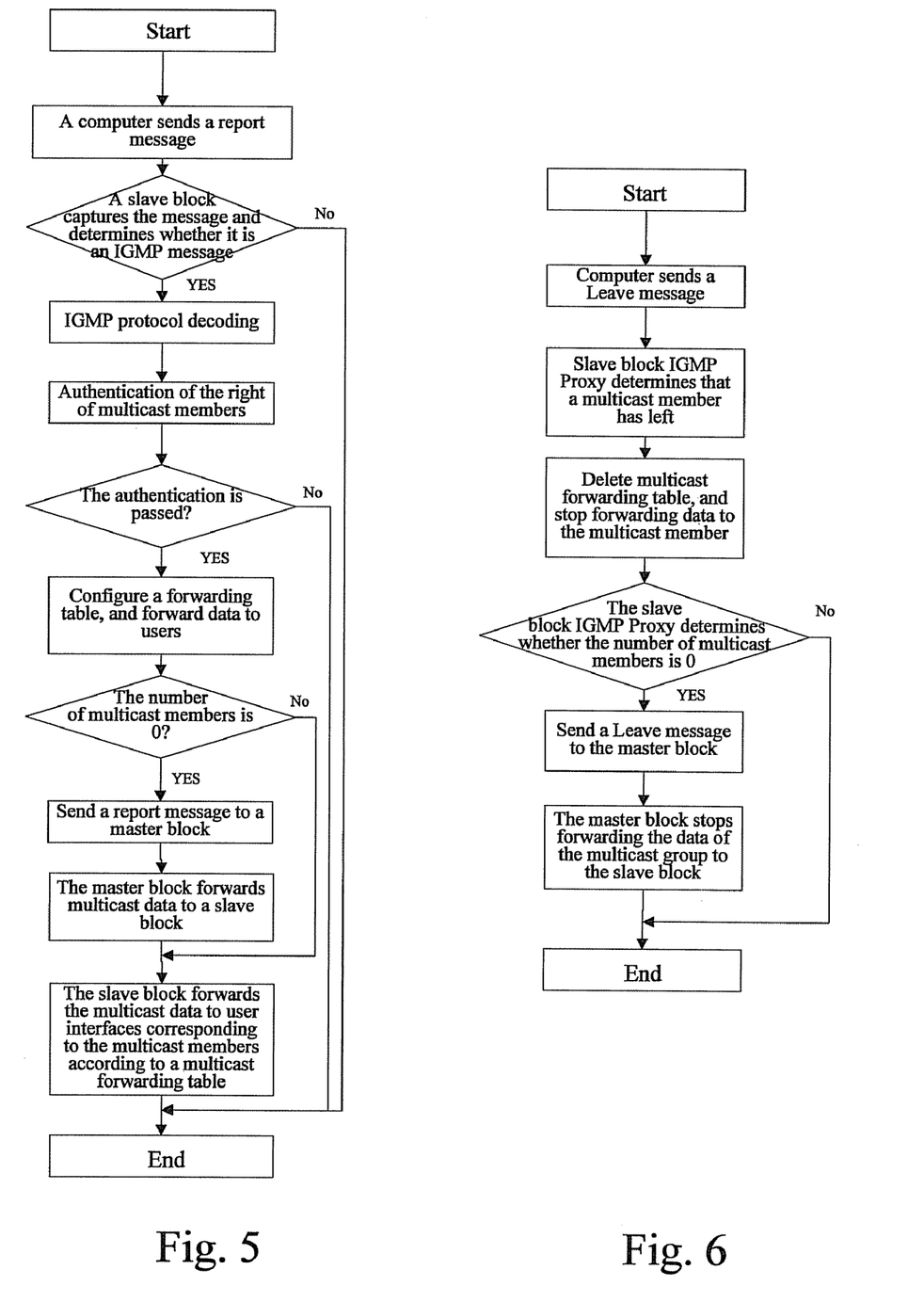
FIG. 5 is a flow chart illustrating the joining of a multicast member of a slave block in accordance with another embodiment of the present invention.
FIG. 6 is a flow chart illustrating the leaving of a multicast member of a slave block in accordance with another embodiment of the present invention.

As shown in FIG. 5, the process that a slave block multicast member joins a multicast group includes the following steps.

1. An IGMP message sent from an ADSL user (e.g., computer or set top box) is captured by the protocol processing module of the slave block. If a message sent from an ADSL user is an IGMP message, it is sent to the protocol processing module for a protocol decoding processing. The IGMP message is identified and the parameters in the protocol, for example, the information such as whether a message is a report message or a leave message, which group the one joins, or which group the one leaves, are extracted.

2. The authentication module authenticates multicast members. A right table needs to be configured for the multicast members before authentication. Which group a multicast member is allowed to join and which group a multicast member is not allowed to join are specified in the right table. The group a multicast member requests joining is compared with contents of the right table during authentication so as to determine whether the multicast member has a right to join the group.

3. After passing the authentication, call a multicast data forwarding module to forward multicast data to the multicast members, and record table entries to be forwarded.

4. The protocol processing module of the slave block determines whether the slave block receives the multicast data of the multicast group; if not, a report message is sent to the master block via the master-slave communication module of the slave block. The protocol processing module of the slave block records the number of the members corresponding to the multicast group; if the number is non-zero, it is shown that the multicast data of the multicast group has been received; if the number is zero, it is shown that the multicast data has not been received.

5. The master-slave communication module of the master block, after receiving the report message of the slave block, forwards the multicast data to the slave block via the multicast data forwarding module of the master block.

6. After the multicast data enters the slave block, the multicast data forwarding module of the slave module forwards the multicast data to the multicast member interface module based on the multicast forwarding table (The multicast forwarding table of the master block is maintained by the master block, and the multicast forwarding table of the master block is changed based on the change that the ADSL users of master block join or leave the multicast group; the multicast forwarding table of the slave block is maintained by the slave block, and the slave block is changed according to that the slave block ADSL user joins or leaves the multicast group). The multicast member interface module converts the multicast data to ATM cells which are then multiplexed into the VC corresponding to the multicast member in order.

There are two methods for determining whether a user leaves a multicast group or not. One method includes that the protocol processing module provides the function of the IGMP querier, sends a multicast general query to all users via a user VC at regular intervals, and determines that a user has left the multicast group in which the user is located if the user has not returned a response message for a predetermined interval. Furthermore, as shown in FIG. 6, a flow chart illustrates the leaving of a multicast member on its own initiative. A user computer that supports the IGMP V2 protocol will, when leaving a multicast group, send a leave multicast group message to the upper layer network, and it is also determined that the user has left a specific multicast group after the leave multicast group message is identified by the protocol processing module.

After finding that the user leaves a multicast group, the multicast data forwarding module stops forwarding multicast data to the multicast members, and the user will not receive the data of the multicast group. Then, the protocol processing module will determine whether the multicast group has other members; if the multicast group does not have, a leave message is sent to the master block via the master-slave communication module. When the master-slave communication module of the master block receives the leave message of the slave block, the multicast data forwarding module of master block stops forwarding the multicast data, and the slave block will no longer receive the data of the multicast group.

In accordance with the embodiments of the present invention, a multicast function is performed in a distributed way. The multicast functions include capture, identification, and forwarding of multicast messages, maintenance of multicast forwarding table and multicast member state. These functions are respectively performed in the master block and the slave block independently and in a parallel way, thereby considerably increasing the efficiency of multicast. In accordance with the embodiments of the present invention, the multicast data are forwarded from the master block to the slave block on demand. When, for example, a master block is cascaded with two slave blocks, slave block A and slave block B, if only slave block A needs to join multicast group G1, and slave block B does not need, then the master block forwards the data of multicast group G1 only to slave block A but not to slave block B. Different from the forwarding on demand in accordance with the embodiments of the present invention, broadcast forwarding is used in the prior art, i.e., the master block will forward all multicast groups received to the slave block, even though the slave block does not need the multicast groups, thereby wasting the bandwidth of the slave block. In accordance with the embodiments of the present invention, the slave block has a duplication point, the master block needs to forward only one copy to the slave block, the slave block can make copies as needed, that is, only one portion of multicast stream bandwidth needs to be consumed for the internal interfaces of the master block and the slave block, and the internal bus of the master block.

The centralized management of multicast data may be adopted in accordance with the embodiments of the present invention. The configuration data of a master block and a slave block both are uniformly saved in the master block, and the synchronization of data is made via an internal data protocol. The multicast data are appeared as a separate data configuration in operation and management, thereby reducing the administrative cost for operators, and being convenient for maintenance. Since the master block and the slave block independently support a multicast function, the master block needs to forward only one copy of multicast data to the slave block, then the slave block independently forwards the multicast data to the multicast members of the slave block, and the master block does not need to do so, thereby considerably saving the bandwidth of the master block, and increasing the efficiency of the master block. Meanwhile, unicast and multicast channels may be adopted for communication between the master block and the slave block, by this means multicast data and control messages are transferred via different interfaces, thereby ensuring the QoS of different services.

Certainly, the configuration data of the master block and the slave block may also be saved independently. In this way, the master block and the slave block processes their own multicast data independently, synchronization of data is no longer required when slave block is started or configuration data of the slave block is modified, and the process that the slave block joins or leaves a multicast group is the same as the aforementioned process in the case that the multicast data of the master block and the slave block are both saved in the master block in a centralized mode. Those skilled in the art may make numerous changes and variations on the method of this invention without departing from the spirit and scope thereof. The foregoing description is only preferred embodiments of this invention and is not for use in limiting the protection scope thereof. All the modifications, equivalent replacements or improvements in the scope of the present invention's spirit and principles shall be included in the protection scope of the present invention.

What is claimed is:

1. A method for implementing multicast using a slave block in Digital Subscriber Line (DSL) access technique, comprising:
    cascading a master block and at least one slave block in a DSL access apparatus via an internal interface so as to allow for commmunicating between the master block and the at least one slave block using an internal protocol, wherein the master block connects with a first DSL user via a first Remote Terminal Unit (RTU) and the at least one slave block connects with a second DSL user via a second RTU;
    configuring each of the master block and the at least one slave block to support any one of an Internet Group Management Protocol (IGMP) proxy and an IGMP snooping, to enable both the master block and the at least one slave block implement respective multicast functions independently and in a parallel way;
    configuring configuration data of both the master block and the at least one slave block in the master block to make both the master block and the at least one slave block be centralized management, the configuration data of the at least one slave block comprising at least one of a multicast protocol parameter of the at least one slave block and multicast member data of the at least one slave block; and
    wherein the multicast protocol parameter comprises an IGMP multicast function switch, a general group query interval, a general group query response time, and a robustness coefficient, and the multicast member data of the at least one slave block comprises xDSL interfaces corresponding to multicast members.

2. The method of claim 1, wherein the multicast function includes capture, identification, forwarding of multicast messages, maintenance of multicast forwarding table, and maintenance of multicast member state.

3. The method of claim 2, wherein the master block and the at least one slave block communicate with each other via at least one channel to transfer unicast data, multicast data, and control information.

4. The method of claim 1, wherein the master block and the at least one slave block communicate with each other via at least one channel to transfer unicast data, multicast data, and control information.

5. The method of claim 4, wherein the at least one channel comprises:
a unidirectional multicast channel for transferring multicast data from the master block to the at least one slave block, and
a bi-directional unicast channel for transferring unicast data, multicast control messages, and control management information between the master block and the at least one slave block.

6. The method of claim 4, further comprising:
synchronizing the configuration data from the master block to the at least one slave block via an internal protocol.

7. The method of claim 6, wherein the synchronizing the configuration data comprises:
when one of the at least one slave block is started,
sending, by the master block, the multicast configuration data of the slave block which is started to the slave block which is started via a unicast channel using the internal protocol; and
configuring a chipset and recovering a software table according to the obtained multicast configuration data so as to make a slave block multicast go into a working state at the slave block.

8. The method of claim 6, wherein the synchronizing the configuration data comprises:
when the configuration data of one of the at least one slave block is modified,
sending, by the master block, a message to instruct the slave block to make a synchronous modification; and
saving the configuration data in the master block for implementing centralized management.

9. The method of claim 6, further comprising:
when a multicast member of one of the at least one slave block joins a multicast group,
sending, by the slave block, a report message to the master block via a unicast channel, and
forwarding, by the master block, multicast data to the slave block; and
when the multicast member of one of the at least one slave block leaves a multicast group,
sending, by the slave block, a leave message to the master block via the unicast channel, and
stopping, by the master block, forwarding the multicast data to the slave block.

10. The method of claim 4, further comprising:
saving, by the master block and the at least one slave block, configuration data of the master block and the at least one slave block independently and respectively;
when one of the at least one slave block is started,
obtaining directly, by the slave block which is started, the configuration data for configuration, and for the slave block which is started to go in a working state;
when the multicast configuration data of the at least one slave block is modified,
modifying and saving directly, by the at least one slave block, the configuration data.

11. The method of claim 10, further comprising:
when a multicast member of one of the at least one slave block joins a multicast group,
sending, by the slave block, a report message to the master block via a unicast channel, and
forwarding, by the master block, the multicast data to the slave block; and
when the multicast member of one of the at least one slave block leaves a multicast group,
sending, by the slave block, a leave message to the master block via the unicast channel, and
stopping, by the master block, forwarding the multicast data to the slave block.

12. The method of claim 1, further comprising:
forwarding only one copy of multicast data from the master block to the at least one slave block via the internal interface.

13. A system for implementing multicast using a slave block in Digital Subscriber Line (DSL) access technique, comprising a multicast server, a DSL access apparatus including a master block, and at least one slave block, wherein:
the multicast server and the maser block are connected with each other via a network;
the master block is connected with a first DSL user via a Remote Terminal Unit (RTU);
the at least one slave block is cascaded with the master block via an internal interface and is configured to communicate with the master block using an internal protocol;
the slave block is connected with a second DSL user via a second RTU;
the master block is configured to access the network via a network interface of the master block;
the master block is configured to save configuration data of the master block and the least one slave block for implementing centralized management, the configuration data of the at least one slave block comprising at least one of a multicast protocol parameter of the at least one slave block and multicast member data of the at least one slave block;
wherein the multicast protocol parameter comprises an IGMP multicast function switch, a general group query interval, a general group query response time, and a robustness coefficient, and the multicast member data of the at least one slave block comprises xDSL interfaces corresponding to multicast members; and
the master block and the at least one slave block are configured to support an Internet Group Management Protocol (IGMP) proxy or an IGMP snooping to implement respective multicast operations independently and in parallel way.

14. The system of claim 13, wherein the master block and the at least one slave block each comprises a protocol processing module, a multicast data forwarding module, a right management module, a multicast member interface module, and a master-slave communication module; and the connection between the master-slave communication modules of the master block and the slave block forms a unicast channel, the connection between multicast data forwarding modules of the master block and the slave block forms a multicast channel.

15. The system of claim 13, wherein
the master block is adapted to forward only one copy of multicast data to the at least one slave block via the internal interface.

16. Digital Subscriber Line (DSL) access apparatus comprising a master block and at least one slave block, wherein
the master block is cascaded with the at least one slave block via an internal interface and is configured to communicate with the at least one slave block using an internal protocol;
the master block comprises a network interface, via which the master block is connected to a network;
the master block is configured to connect with a first DSL user via a first Remote Terminal Unit (RTU);
each of the at least one slave block is configured to connect with a second DSL user via a second RTU;

the master block comprises:

a protocol processing module, adapted to process an Internet Group Management Protocol (IGMP) multicast protocol and maintain a multicast forwarding table;

a multicast data forwarding module, adapted to forward multicast data to a multicast member of the master block according to the multicast forwarding table and forward multicast data to the at least one slave block via the internal interface;

a multicast member interface module, adapted to manage an interface between the master block and the multicast member of the master block; and each of the at least one slave block comprises:

a protocol processing module, adapted to process an Internet Group Management Protocol (IGMP) multicast protocol and maintain a multicast forwarding table;

a multicast data forwarding module, adapted to forward multicast data to a multicast member of the slave block according to the multicast forwarding table;

a multicast member interface module, adapted to manage an interface between the slave block and the multicast member; and a master-slave communication module, adapted to communicate multicast information between the master block and the slave block; wherein:

an interface between the slave block and the multicast member of the slave block; and wherein both the master block and the at least one slave block are configured to implement multicast functions independently and in a parallel way;

the master block is configured to save configuration data of both the master block and the least one slave block for implementing centralized management, the configuration data of the at least one slave block comprising at least one of a multicast protocol parameter of the at least one slave block and multicast member data of the at least one slave block, wherein the multicast protocol parameter comprises an IGMP multicast function switch, a general group query interval, a general group query response time, and a robustness coefficient, and the multicast member data of the at least one slave block comprises xDSL interfaces corresponding to multicast members.

17. The DSL access apparatus of claim 16, the master block further comprising:

a right management module, adapted to manage a right of the multicast member of the master block and authenticate the multicast member of the master block; and each of the at least one slave block further comprising:

a right management module, adapted to manage a right of the multicast member of the slave block and authenticate the multicast member of the slave block.

18. The DSL access apparatus of claim 16, wherein:

the master-slave communication module of the slave block is connected with a master-slave communication module of the master block to form a unicast channel; and the multicast data forwarding module of the at least one slave block is connected with the multicast data forwarding module of the master block to form a multicast channel.

19. The DSL access apparatus of claim 18, the master block further comprising:

a right management module, adapted to manage a right of the multicast member of the master block and authenticate the multicast member of the master block; and each of the at least one slave block further comprising:

a right management module, adapted to manage a right of the multicast member of the slave block and authenticate the multicast member of the slave block.

20. The DSL access apparatus of claim 16, wherein the multicast data forwarding module of the master block is adapted to forward only one copy of multicast data to the multicast data forwarding module of the at least one slave block via the internal interface.

* * * * *